UNITED STATES PATENT OFFICE.

GEORGE G. MARX, OF DETROIT, MICHIGAN.

IRON COMPOSITION.

1,339,469.   Specification of Letters Patent.   Patented May 11, 1920.

No Drawing.   Application filed June 16, 1919. Serial No. 304,488.

*To all whom it may concern:*

Be it known that I, GEORGE G. MARX, a citizen of the United States of America, residing at Detroit, in the county of Wayne and State of Michigan, have invented certain new and useful Improvements in Iron Composition, of which the following is a specification.

In the manufacture of cast iron and semi-steel from pig iron and scrap steel and iron, the resultant or iron product is of coarse grain, and in the majority of instances has an indurate skin or chilled surface which is injurious to drills, cutters, files or any tool ordinarily employed to cut or shape the cast iron. The molded product is furthermore susceptible to blow holes, pipes and scales, as compared to the product in accordance with my invention or process of producing cast iron.

The object of my invention or process is to produce a fine grained, soft, scaleless cast iron that may be molded in metal molds under force feed, in contradistinction to the usual sand mold, consequently makes it possible to obtain castings of a finer finish than by the usual process.

Besides using pig iron and scrap steel and scrap cast iron, I utilize a clay product, as bricks, that is high in silica and it is this silica addition that produces a superior product, facilitates the manufacture, and makes the process more economical by permitting of less pig iron and more scrap being used.

My invention or process combines a mixture of pig iron, machinery cast iron, and bricks.

In preparing the composition, for gray iron, I prefer to use the ingredients in about the following proportion—viz., pig iron thirty five per cent., machinery scrap iron sixty per cent. and brick five per cent. The bricks may be mixed in with either of the above ingredients, and the ingredients are adapted to be placed in a cupola, in the usual manner, with intermediate layers of coke, so that the entire mass may be fired and the ingredients reduced to cast iron.

For semi-steel or an alloy of iron and steel, the same ingredients in about the above proportions are employed and about five per cent. scrap steel added, reducing the proportions of pig iron or scrap iron.

The pig iron may be a standard iron or any good grade which is about two and one half per cent. silicon and the steel is preferably drop forged cuttings, for instance the shavings from crank shaft cuttings.

The machinery scrap cast iron contains usually less than one per cent. silicon, and the bricks are very high in silica. Ordinary fire brick may be used, when broken up into small pieces so as to be readily attacked, whereby the silica and clay ingredients of the fire bricks makes a flux and produces a higher temperature. The flux thus produced drives sulfur from the iron into the slag and prevents the withdrawal of carbon and other impurities from the coke. Since carbon flakes are eliminated the resulting product is of a close grain, and the high temperature produced by the flux causes graphite and other impurities to be completely eliminated.

The steel in the cast iron lends strength to the same, without any hardness, and for a cheaper product the percentage of the pig iron may be reduced and the percentage of the cast scrap iron increased. However, it is preferable to have the fire brick or clay product represent five to eight per cent. of the entire mixture which produces cast iron of an even fine consistency throughout, soft enough for tool operations, and strong enough for various uses. By eliminating the usual chilled and indurate surface on the castings, it is possible for tools to operate on the castings without edges being turned or the tools injured, and as far as I am aware such cast iron has not been heretofore commercially produced. In the old process of melting iron flakes of graphite catch between the grains of the iron and also form a hard scale on the surface of the casting, and it is this scale which generally contributes to the strength of the iron. When the surface of the cast iron is machined and the scale interrupted, it is obvious that the strength of the iron is reduced and a poor wearing surface is the result. This is particularly true when engine cylinders are cast *en bloc*. A finished cylinder will have walls with open grains affording a poor working surface for the hard piston rings of a piston, consequently the walls of the cylinder are scored to an extent that leakage occurs. With my product, however, there is no graphitic flakes and consequently a fine close grain finish is produced which will afford a good wearing surface. Then again, when machining an ordinary piece of cast iron, particularly on one side, there is warpage of the piece of cast iron due to one surface of the machined piece being soft and the opposite surface hard, on account of the scale chilled surface, consequently additional machining is required. With my product having no hard scale or chilled surface warpage is entirely eliminated and therefore less machining is required on a piece of cast iron.

I claim:

1. An iron and steel alloy made from pig iron, steel and scrap cast iron and including as an essential ingredient a clay product.

2. The process of producing cast iron consisting of melting pig iron, steel and scrap iron with a clay product high in silica and producing a flux which prevents impurities from entering the cast iron.

3. A process of making semi-steel consisting of preparing pig iron, steel and scrap iron to be melted into a homogeneous mass, and adding crushed fire brick to the mass so that the silica in the fire brick may produce a fine grained scaleless soft cast iron while the clay products in the fire brick maintains a flux, a higher temperature and prevents the entrance of carbon, sulfur, graphite and other impurities into the cast iron.

4. A process of making cast iron consisting of preparing pig iron, and scrap iron to be melted into a homogeneous mass, and adding crushed fire brick to the mass so that the silica in the fire brick may produce a fine grained scaleless soft cast iron while the clay products in the fire brick maintains a flux, a higher temperature and prevents the entrance of carbon, sulfur, graphite and other impurities into the cast iron.

5. The process of making iron which comprises melting pig iron with scrap cast iron and incorporating a clay product.

6. The process of making iron which comprises melting iron with a crushed vitreous material high in silica.

In testimony whereof I affix my signature in the presence of two witnesses.

GEORGE G. MARX.

Witnesses:
KARL H. BUTLER,
ANNA M. DORR.